(12) United States Patent
Gunturi et al.

(10) Patent No.: US 12,501,198 B2
(45) Date of Patent: Dec. 16, 2025

(54) SYSTEM, APPARATUS AND METHOD FOR DETECTING AND AVOIDING PERIODIC UNRESPONSIVENESS OF A RECEIVER

(71) Applicant: Silicon Laboratories Inc., Austin, TX (US)

(72) Inventors: Karthik Gunturi, Hyderabad (IN); Varinder Romley, Hyderabad (IN); Sunit Pujari, Hyderabad (IN); Govardhan Reddy Polu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 550 days.

(21) Appl. No.: 17/987,946

(22) Filed: Nov. 16, 2022

(65) Prior Publication Data

US 2024/0163597 A1    May 16, 2024

(51) Int. Cl.
  *H04R 1/10*    (2006.01)
(52) U.S. Cl.
  CPC ....... *H04R 1/1016* (2013.01); *H04R 2420/07* (2013.01)
(58) Field of Classification Search
  CPC .......................... H04R 1/1016; H04R 2420/07
  See application file for complete search history.

(56) References Cited

U.S. PATENT DOCUMENTS

| 7,689,128 B2 * | 3/2010 | Williams | H04N 7/17309 |
| | | | 398/164 |
| 8,437,415 B2 | 5/2013 | Mudulodu et al. | |
| 9,307,419 B1 * | 4/2016 | Singh | H04W 24/02 |
| 10,735,035 B1 * | 8/2020 | Gambini | G01S 13/345 |
| 10,827,451 B2 | 11/2020 | Mudulodu | |
| 11,177,860 B2 * | 11/2021 | Park | H02J 50/80 |
| 2017/0055089 A1 * | 2/2017 | Pedersen | H04L 65/1069 |
| 2021/0075557 A1 | 3/2021 | Mudulodu et al. | |
| 2022/0141893 A1 * | 5/2022 | Choi | H04R 1/1091 |
| | | | 370/329 |
| 2022/0182934 A1 * | 6/2022 | Kumar | H04W 52/0229 |
| 2023/0179902 A1 * | 6/2023 | Xie | H04R 1/1041 |
| | | | 381/311 |
| 2023/0299925 A1 * | 9/2023 | Bonde | H04L 1/1825 |
| | | | 370/329 |

OTHER PUBLICATIONS

U.S. Appl. No. 17/472,935, filed Sep. 13, 2021, entitled "System, Apparatus and Method for Acquisition of Signals in Wireless Systems With Adverse Oscillator Variations," in the name of Sriram Mudulodu, et al.

* cited by examiner

*Primary Examiner* — Oyesola C Ojo
(74) *Attorney, Agent, or Firm* — Trop, Pruner & Hu, P.C.

(57) ABSTRACT

In one aspect, a method includes: transmitting, from a transmitter, a first packet to a device wirelessly coupled to the transmitter; in response to not receiving a response regarding the first packet from the device, retransmitting the first packet until a response is received; transmitting a plurality of second packets to the device, the second packets having a smaller width than the first packet; identifying a periodic polling interval at which the device communicates with another device; and adjusting a transmit clock slot and transmitting one or more third packets to the device according to the adjusted transmit clock slot.

20 Claims, 8 Drawing Sheets

SYSTEM, APPARATUS AND METHOD FOR DETECTING AND AVOIDING PERIODIC UNRESPONSIVENESS OF A RECEIVER

BACKGROUND

Wireless Bluetooth earbuds are commonly used devices. A pair of earbuds has two Bluetooth transceivers (primary and secondary) connected to each other, where one (primary) is connected to an audio source (e.g., mobile phone) in a scatternet configuration. The secondary either acts as a sniffer collecting the packets transmitted by the audio source, or the primary earbud relays packets to the secondary earbud. To maintain connection between the earbuds, the primary earbud transmits POLL/Data packets. This communication could collide with the data packets transmitted by the audio source, which can adversely affect integrity, power consumption, etc. Certain earbuds avoid this collision by adjusting their polling interval. However other devices maintain a periodic polling interval between earbuds.

SUMMARY OF INVENTION

In one aspect, an apparatus includes: a controller to receive a data stream from a source, the controller to schedule the data stream for transmission as a plurality of data packets, where when a receiver in wireless communication with the apparatus does not respond to a first data packet having a first portion of the data stream, retransmit the first data packet and thereafter fragment a second portion of the data stream into a plurality of fragmented data packets and schedule the plurality of fragmented data packets for transmission; —a digital-to-analog converter (DAC) to convert the plurality of data packets and the plurality fragmented data packets into analog form; a radio frequency (RF) circuit coupled to the DAC, the RF circuit to process the plurality of data packets and the plurality fragmented data packets in the analog form and output a plurality of RF signals; and a power amplifier coupled to the RF circuit to amplify and output the plurality of RF signals.

In one implementation, the controller is to detect a periodic non-responsiveness of the receiver. The controller may be configured to adjust a transmission slot schedule for at least some of the plurality of data packets based on the periodic non-responsiveness. The controller may be configured to adjust the transmission slot schedule comprising a shift of a transmit clock slot by a plurality of slots, for at least a portion of the plurality of the data packets.

In one implementation, the controller is to: detect the periodic non-responsiveness comprising a periodic polling interval at which the receiver communicates with another device; and cause the power amplifier to output at least some of the plurality of RF signals when a polling operation of the periodic polling interval is not occurring. The controller may further: identify a first clock slot in response to not receiving a response to a first one of the plurality of fragmented packets; identify a second clock slot in response to not receiving a response to a second one of the plurality of fragmented packets; and identify a third clock slot in response to not receiving a response to a third one of the plurality of fragmented packets. The controller may also be configured to identify a period of the periodic non-responsiveness based at least in part on the first clock slot, the second clock slot, and the third clock slot. The controller may also schedule one or more poll packets following the plurality of fragmented data packets.

In another aspect, a method comprises: transmitting, from a transmitter, a first packet to a device wirelessly coupled to the transmitter; in response to not receiving a response regarding the first packet from the device, retransmitting the first packet until a response is received; transmitting a plurality of second packets to the device, the second packets having a smaller width than the first packet; identifying a periodic polling interval at which the device communicates with another device; and adjusting a transmit clock slot and transmitting one or more third packets to the device according to the adjusted transmit clock slot.

In an example, the method further comprises: identifying a first clock slot in response to not receiving a response to a first one of the plurality of second packets; identifying a second clock slot in response to not receiving a response to a second one of the plurality of second packets; and identifying a third clock slot in response to not receiving a response to a third one of the plurality of second packets. The method may also include identifying a period of the periodic polling interval based at least in part on the first clock slot, the second clock slot and the third clock slot. In addition, the method may further comprise identifying the period when a difference between the second clock slot and the first clock slot equals a difference between the third clock slot and the second clock slot.

In an example, adjusting the transmit clock slot comprises shifting the transmit clock slot by a plurality of slots. This shifting of the transmit clock slot may be based at least in part on an offset determined based at least in part on a current clock slot, the first clock slot and the period of the periodic poll interval.

In an example, adjusting the transmit clock slot enables the device to receive the one or more third packets without collision with a polling operation between the device and the second device, the polling operation occurring according to the periodic polling interval.

In an example, the method may further comprise transmitting the first packet comprising a plurality of slots. The method also may comprise transmitting the plurality of second packets, each of the plurality of second slots comprising a single slot.

In another aspect, a system comprises: an audio source to provide audio content; a controller coupled to the audio source, the controller to schedule packets of the audio content for transmission according to a slot schedule, where the controller is to update the slot schedule in response to detection of a periodic polling interval between a receiver of the transmission and another device coupled to the receiver; a baseband circuit to process and output the packets of the audio content according to the slot schedule and thereafter according to the updated slot schedule; a RF circuit coupled to the baseband circuit, the RF circuit to process the packets of the audio content and output a plurality of RF signals; and a power amplifier coupled to the RF circuit to amplify and output the plurality of RF signals.

In an implementation, the controller is to update the slot schedule by shifting a transmit clock slot by a plurality of slots based on an offset determined according to a current clock slot, a first clock slot at which one of the packets of the audio content was not received by the receiver and a period of the periodic polling interval. The controller may be configured to detect the periodic polling interval that occurs between the receiver comprising a first earbud and the another device comprising a second earbud.

DETAILED DESCRIPTION

In various embodiments, a transceiver may include a controller configured to determine when a paired device is not successfully receiving one or more packet communications. When such packet loss is identified, the controller may determine whether the paired device is not receiving packets, e.g., due to a periodic polling interval between the paired device and another device. Upon such determination, the controller may modify a transmit clock so that packets can be communicated in a manner that does not interfere with the periodic polling interval or other periodic unresponsiveness. Although embodiments are described in connection with periodic polling interval interference, other implementations can be used for other cases in which packets are intermittently not being successfully received.

Figure 1:
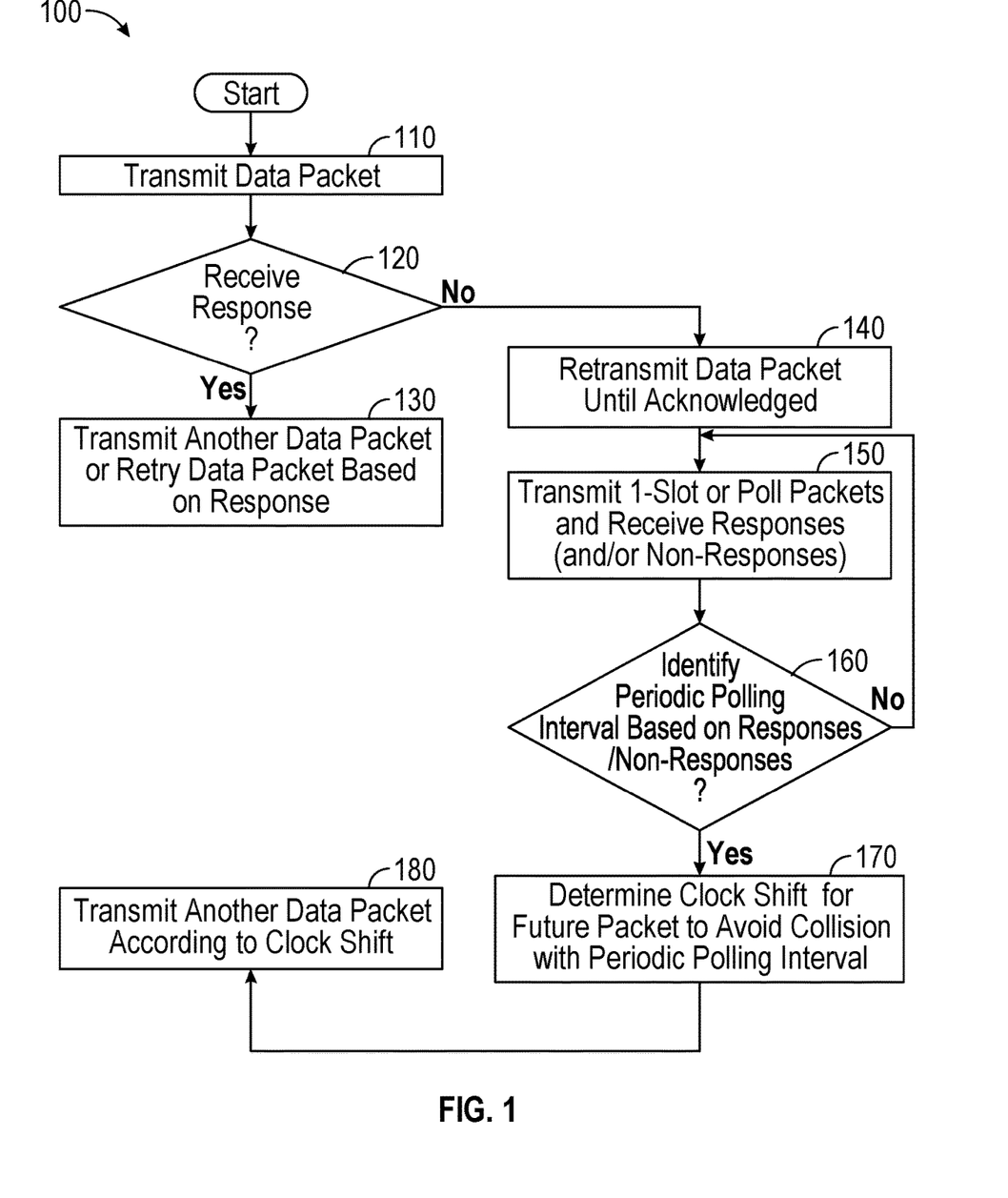
FIG. 1 is a flow diagram of a method in accordance with an embodiment.

Referring now to FIG. 1, shown is a flow diagram of a method in accordance with an embodiment. More specifically as shown in FIG. 1, method 100 is a method for controlling timing of transmissions from a transmitter, to avoid interference with a polling interval or other activity of a paired device. In embodiments herein method 100 may be performed by hardware circuitry of a transmitter, including a Bluetooth controller. For example, the Bluetooth controller may execute instructions stored in a non-transitory storage medium to perform method 100.

As illustrated, method 100 begins by transmitting a data packet (block 110). In various implementations, this first data packet may be a multi-slot data packet, e.g., including audio message information (e.g., a 5-slot packet). This data packet transmission may occur according to a schedule maintained by the Bluetooth controller. As such, this data packet may be transmitted according to a given clock, e.g., a Bluetooth clock, also referred to herein as a "slot." That is, as used herein, the terms "slot," "Bluetooth clock," and "transmit clock" are used interchangeably to refer to a scheduled time instance at which a packet is to be communicated. To this end, note that according to a Bluetooth Specification (e.g., Bluetooth Core Specification, v. 5.3 (Jul. 13, 2021) uses the terms "Bluetooth Clock" and "tick" interchangeably, where, according to this Specification, one slot equals 2 clock ticks (where each clock tick is 312.5 microseconds (μs)), such that a slot width is 625 μs.

Next it is determined at diamond 120 whether a response is received. According to the Bluetooth Specification, appropriate responses may be a NULL packet with an acknowledgement (ACK) bit set to 1 indicating acknowledgement or ACK bit set to 0 indicating no acknowledgement/data corruption. If a valid response is received, control passes to block 130 where another data packet or a retried data packet may be transmitted, based on the received response. When a packet is successfully received in the receiver, a next data packet may be transmitted, while in the case of a NAK, a retry data packet having the same information as the originally sent data packet may be re-transmitted.

Still referring to FIG. 1, instead if it is determined that no response was received for the data packet (at diamond 120), control passes to block 140. At block 140 this same data packet is retransmitted until it is acknowledged by the receiver. Thereafter, control passes to block 150 where single slot packets (which may be 1-slot packets of new data provided by a host) or poll packets may be sent.

Still referring to FIG. 1, at diamond 160 after a series of these 1-slot or poll packets have been sent, it may be determined whether a periodic polling interval can be identified based on responses/non-responses to these shorter packets. Details of this determination are discussed further below. Suffice it to say, if a periodic interval between non-receipt of responses can be identified, a successful determination of a periodic polling interval may exist. This is so, as it may be assumed that since a receiving device does not successfully receive certain packets at a periodic interval, i.e., the receiving device may be otherwise occupied by communicating with another device (such as a secondary earbud in this scenario). If no such periodic polling interval is identified, control passes to block 150 where additional transmission, e.g., of these smaller packets may occur.

Still with reference to FIG. 1, if a periodic polling interval is successfully identified, control passes to block 170. At block 170 a clock shift may be determined based at least in part on this periodic polling interval. This clock shift for further (larger, e.g., 5-slot) packets may be performed in a manner designed to avoid collision with inter-device communication between devices (such as a pair of earbuds). Various details of this clock shift determination are described further below; understand that by way of the clock shift, additional data packets can be communicated in a manner that is intended to avoid interference or collision, e.g., with polling activities of the receiving device with another device such as a secondary earbud.

Still referring to FIG. 1, control next passes to block 180 where another data packet may be transmitted according to this clock shift. Understand that of course additional further packets may be communicated with the same clock shift, at least until it is again determined (e.g., at diamond 120) that a response is not received for a given packet. Although shown at this high level in the embodiment of FIG. 1, many variations and alternatives are possible.

Figure 2A:
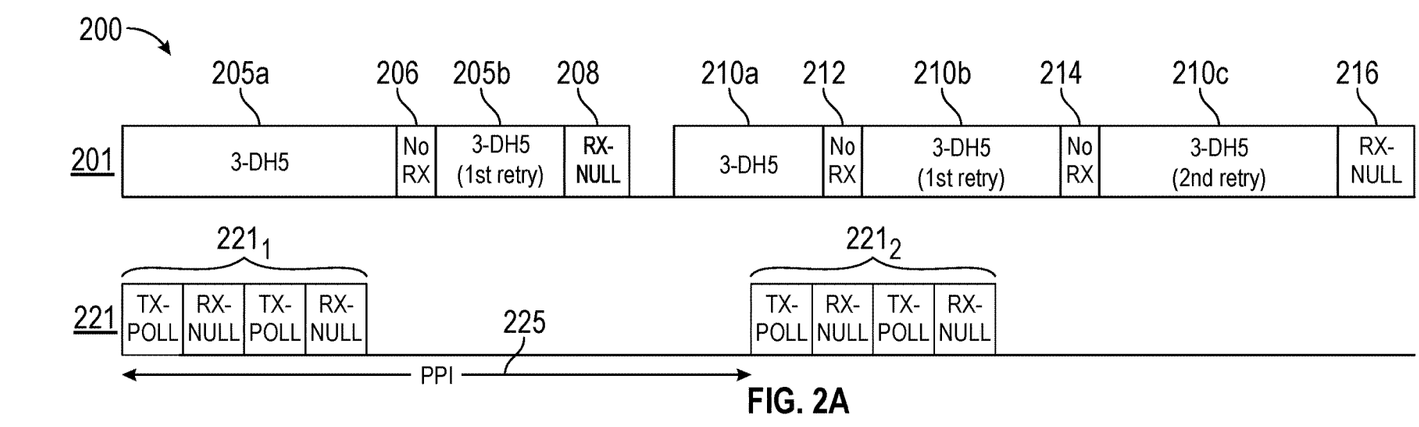
FIG. 2A is a timing diagram of data communication illustrating a non-response from a receiver, due to periodic polling between the receiver and another device.

Referring now to FIG. 2A, shown is a timing diagram of data communication illustrating a non-response from a receiver, due to periodic polling between the receiver and another device. More specifically as shown in FIG. 2A, in illustration 200, a data communication 201 occurs between a transmitter (e.g., an audio source) and a receiving device (e.g., an earbud). As illustrated, a first data packet $205_a$ is sent. Understand the timing illustrations of FIG. 2A (and following figures) are not drawn to scale, in that regions of packet and polling communications do not exactly align.

In FIG. 2A, a Bluetooth host (e.g., audio source) transmits audio packets to the controller at regular intervals, and the controller schedules data packets for transmission over the air, e.g., based on a first in first out (FIFO) scheme. In the illustration of FIG. 2A, this data packet is a multi-slot packet, namely a five-slot packet that is of a 3-DH5 format (according to the Bluetooth Specification).

As further shown in FIG. 2A, without an embodiment no response is received in slot 206, due to a first instance $221_1$ of an inter-device polling operation 221 which occurs according to a periodic polling interval 225. Polling operation 221 is thus a regular polling between earbuds during which the primary earbud becomes unresponsive to the transmitter for short periods of time, causing retry of data packets (namely a first retry packet $205_b$ occurs, leading to a successful response 208), resulting in high packet error rate and thereby consuming high power.

As seen, in each polling duration 221, two transmit poll slots and two receive response slots occur in this example; of course other devices may have a different format for a periodic polling operation. Thus due to first polling duration $222_1$, first packet $205_a$ is not validly received, and similarly due to second polling duration $222_2$, second packet $210_a$ is not validly received. And as a result of second polling duration $222_2$, without an embodiment two retry packets ($210_{b-c}$) are required for a successful receipt of second data packet 210.

Figure 2B:
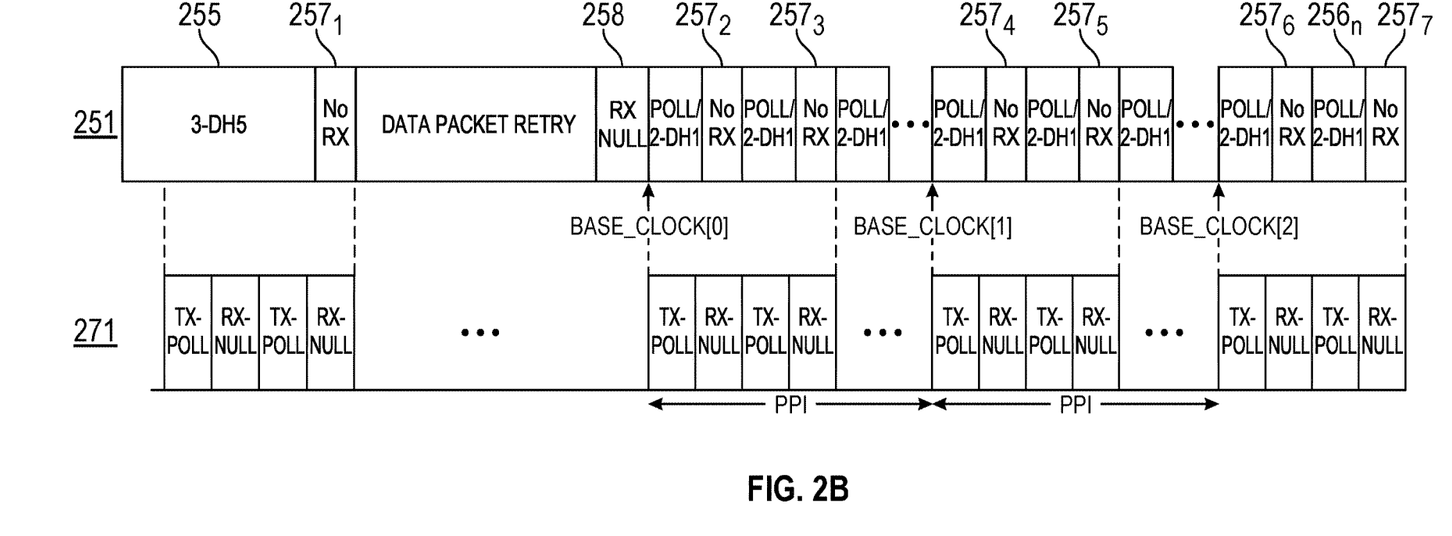
FIG. 2B is a timing diagram illustrating a technique for identification of a periodic polling interval pattern in accordance with an embodiment.

Referring now to FIG. 2B, a timing diagram illustrates a technique for identification of a periodic polling interval pattern in accordance with an embodiment. As shown in FIG. 2B, a data transmission 251 begins with a first data packet 255 that is not successfully received as no response occurs in slot $257_1$. Accordingly, a transmitter (and more particularly a Bluetooth controller associated with the transmitter) may cause data packet 255 to be retransmitted (also denoted as first data packet 255, which is properly received as shown by receipt of a NULL packet at slot $257_2$. At this point, new data from the host may be fragmented into 1-slot packets and sent as shown as a plurality of single slot packets $256_{1-n}$ to be communicated in a plurality of slots. After each transmit slot, in a receive slot the single slot/POLL packet (POLL if no data is available) is either successfully acknowledged (as in slot 258) or no response is received (as in slots $257_{2-7}$). As shown for further reference, the slots of no response received are due to a polling operation 271.

With embodiments, analysis for which slots responses are received and which slots they are not may be used to identify a polling interval and further to determine a period of such polling interval, such as discussed above in FIG. 1. In one or more embodiments, a collision avoidance technique may be performed by a controller (e.g., a Bluetooth controller of a transmitter) in accordance with the following general algorithm:
1. When no response is received from a remote device for a multi-slot data packet, retry the packet until it is acknowledged by the remote device.
2. After the packet retransmission(s), transmit single-slot packets when data is available or POLL packets (when no data is available) continuously.
3. In the periodic polling interval scenario, the remote destination will be unresponsive to these packets at regular intervals (e.g., 2 packets every polling interval).
4. Store a clock value (BASE_CLOCK[x]) (e.g., a 28-bit value) of a first packet of two/three consecutive unresponsive 1-slot/POLL packets.
5. Repeat transmitting 1-slot/POLL packets until there are more instances of two/three consecutive unresponsive 1-slot packets (and storing BASE-CLOCK[x]).
6. Determine periodicity of unresponsiveness, PERIODIC_POLLING_INTERVAL, using the BASE_CLOCK identified above for the 1-slot packets and, optionally, a number of RETRIES.
7. In the above scenario, periodic polling happens twice at every regular interval. Hence, the technique avoids transmitting in those 2 TX slots.
8. For any packet to be transmitted in the future at a CURRENT_CLOCK, consider a difference between the CURRENT_CLOCK and the first BASE_CLOCK.

CLOCK_DIFF=CURRENT_CLOCK−BASE_CLOCK

9. For 1-slot, 3-slot or 5-slot packets, offset the value of this clock difference by a desired number of slots to avoid a collision interval (e.g., clashing with the PERIODIC_POLLING_INTERVAL in the third or fifth slot).

Figure 3:
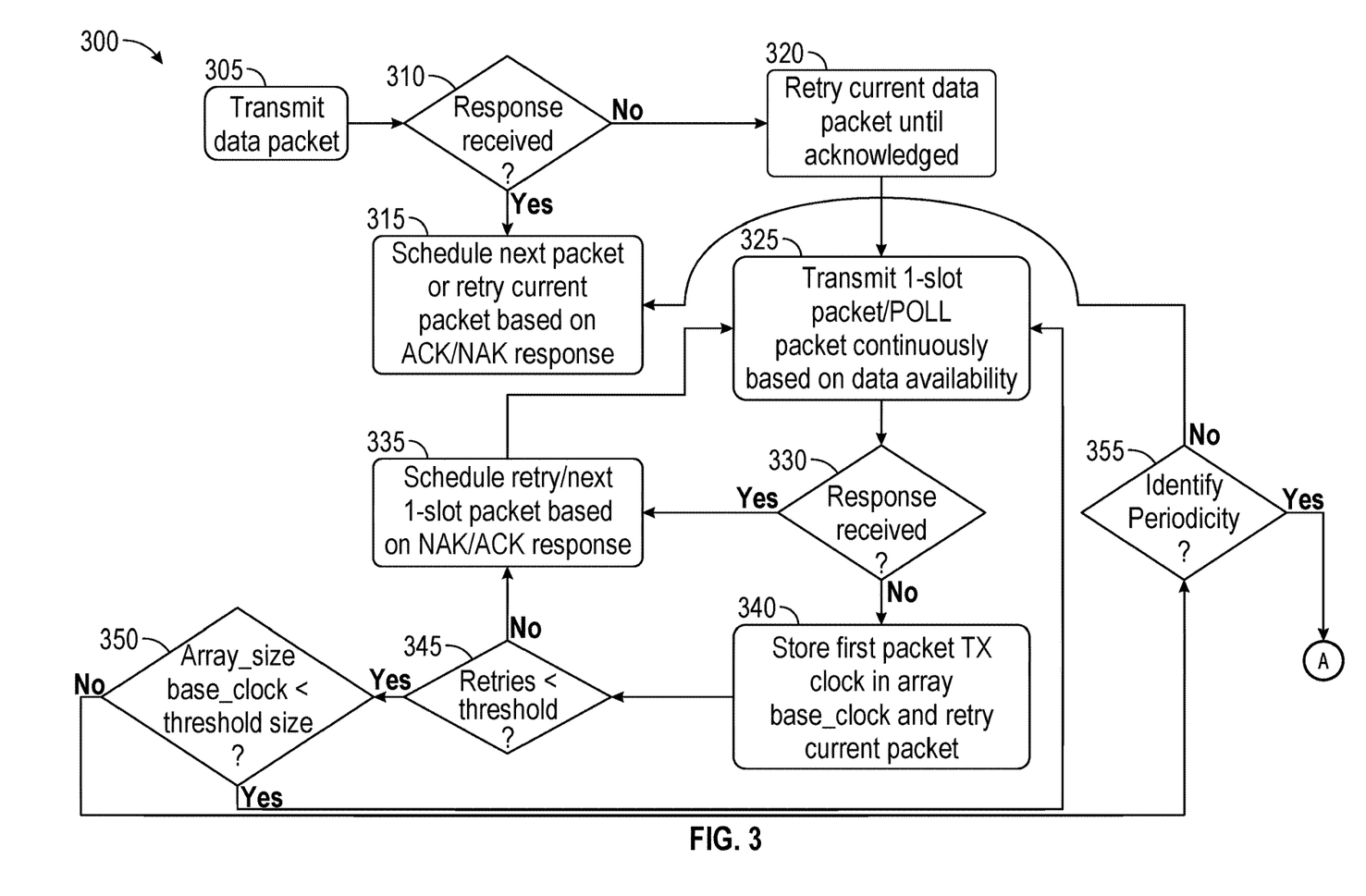
FIG. 3 is a flow diagram of a method in accordance with another embodiment.

Referring now to FIG. 3, shown is a flow diagram of a method in accordance with another embodiment. More specifically, method 300 of FIG. 3 is a more detailed implementation for adjusting timing of transmitted data packets in accordance with an embodiment. Method 300 may be performed by hardware circuitry of a transmitter such as a Bluetooth controller, which may execute instructions stored in a non-transitory storage medium.

As illustrated, method 300 begins by transmitting a data packet (block 305). At diamond 310 it is determined whether a response is received. If so, a next packet or a retry packet may be sent based on the response (block 315).

Still referring to FIG. 3, instead if it is determined that no response is received, control passes to block 320 where the data packet may be retried (retransmitted) until it is acknowledged. At this point, control passes to block 325 where if there is additional data from a host it is fragmented into one-slot packets, which may be continuously transmitted based on data availability (block 325). If there are no more available one-slot data packets to transmit, poll packets may be sent.

For each given packet, it is determined whether a response is received (diamond 330). If so, a next packet or retry packet may be scheduled (block 335) and then transmitted (back to block 325). Instead when no response is received, control passes to block 340 where a clock for the transmit packet that is not received may be stored in an array (referred to as a base clock array, and where this first transmit clock may be referred to as a first base clock slot (BASE_CLOCK[0])). Still further at block 340, the current packet may be retried. Control next passes to diamond 345 to determine whether the number of retries is less than a threshold. If not, control passes to block 335 discussed above. When it is determined that the number of retries meets the threshold, it is next determined whether the number of base clocks in the array is less than a different threshold (diamond 350). If so, control passes back to block 325 for further single slot packet transmission.

Otherwise, when it is determined that the number of base clocks in the array (meaning the number of one-slot packets that do not receive responses) has been reached, control passes to diamond 355. At diamond 355, it may be determined whether a periodic interval between the missed packets can be determined. In one embodiment, this determination may be according to whether differences between instances of the BASE_CLOCK values are equal, e.g.: {BASE_CLOCK[2]−BASE_CLOCK[1]}={BASE_CLOCK[1]−BASE_CLOCK[0]}.

If no periodicity can be identified, no further operations for adjustment of a transmission clock occur and control passes to block 315 for a scheduling of a next or retry packet, without modifying the Bluetooth clock.

Still referring to FIG. 3, if a periodicity has been identified, control passes to block 360 where a polling interval is determined. In one embodiment the determination may be according to: POLLING_INTERVAL=BASE_CLOCK[1]−BASE_CLOCK[0]. Thereafter at block 365, a next packet may be scheduled. At block 370 a clock difference may be calculated between the current clock value and the first base clock value, e.g., according to: CLOCK_DIFF= CURRENT_ CLOCK−BASE_CLOCK[0]. Then at block 375 a clock difference offset may be calculated according to: CLOCK_DIFF_X=CLOCK_DIFF+(X−1)*2, where X=1, 3, 5.

Thereafter at clock 380, a modulo operation is performed to identify a remainder value for the clock. In an embodiment, this modulo operation may be according to: CLOCK_REMAINDER=CLOCK_DIFF_X mod PERIODIC_POLLING_INTERVAL. In an implementation, for a 1-slot packet and 1 retry, CLOCK_REMAINDER can be 0 or 4; for a 3-slot packet and 1 retry, CLOCK_REMAINDER can be 0, 4 or 8; and for a 5-slot packet and 1 retry, CLOCK_REMAINDER can be 0, 4, 8 or 12.

Still with reference to FIG. 3, next it is determined whether this clock remainder is within a threshold range (e.g., between zero and a threshold maximum, corresponding to (X+1)*2+RETRIES*4, where X=1,3,5 (diamond 385). If so, a Bluetooth clock shift operation may be performed, to shift the transmit clock by a selected amount (block 390). In an embodiment, this clock shift may be according to, e.g., a given number of ticks corresponding to a transmit slot: CLOCK_SHIFT (in ticks)=((X+1)*2+RETRIES*4)−CLOCK_REMAINDER. Control next passes to block 395 where a data packet may be scheduled for transmission according to this shifted clock. With this shifting of the transmit clock by some number of ticks, a periodic polling interval between a receiver and another device (e.g., two earbuds) can be avoided.

Figure 4:
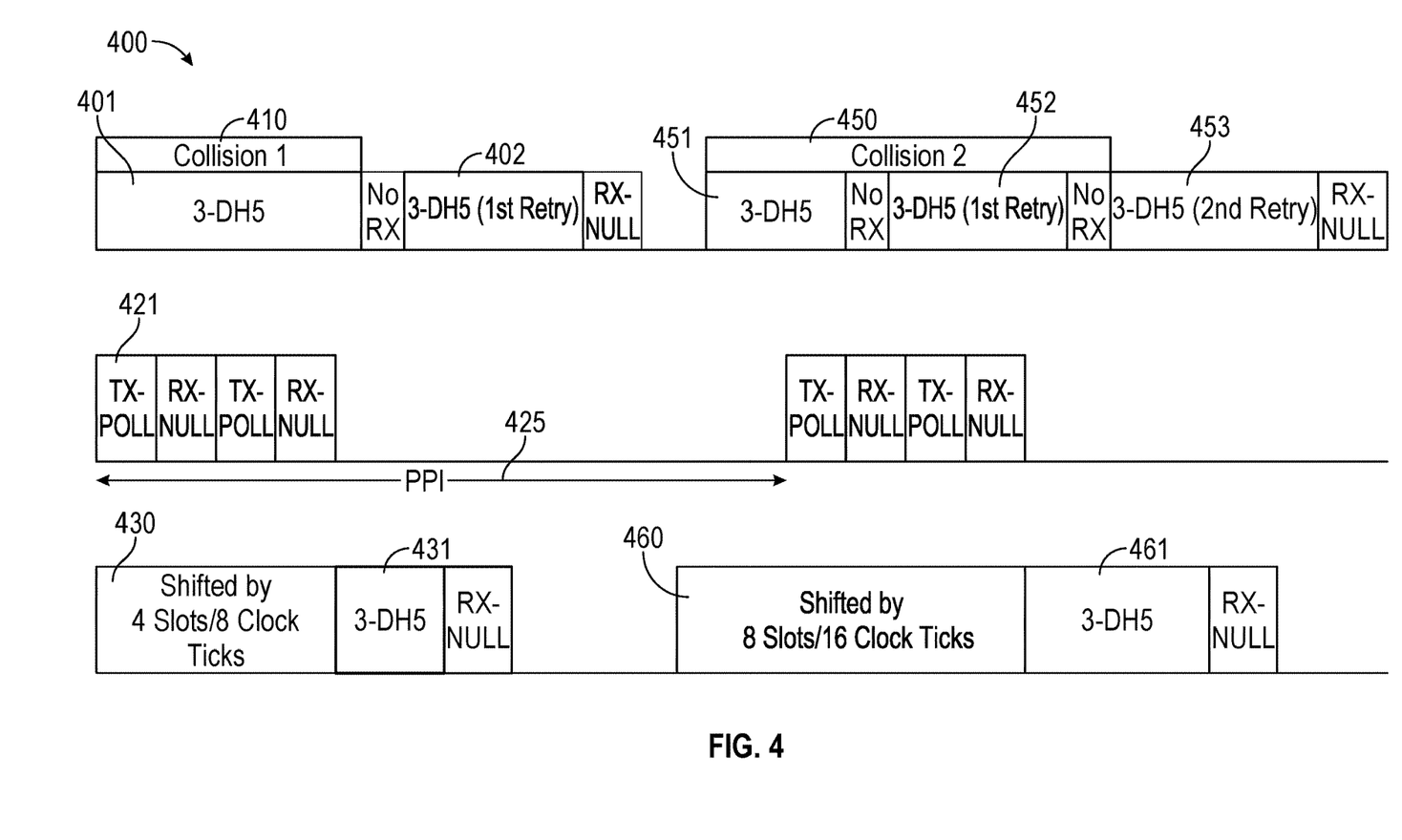
FIG. 4 is a timing diagram of data communication illustrating transmitter detection of collisions occurring due to periodic polling between a receiver and another device in accordance with an embodiment.

With embodiments, data reliability may be improved and the number of retries that may be required can be reduced, which may further reduce power consumption. Referring now to FIG. 4, shown is a timing diagram of a data communication 400 illustrating transmitter detection of collisions occurring due to periodic polling between a receiver and another device, and a transmission slot adjustment to avoid this polling and thus reduce or avoid retries. As illustrated in FIG. 4, in a first collision situation scenario 410, also identified as Collision 1, a retry is required due to collision between first packet 401 of the data communication and a polling interval 421, leading to a retry packet 402.

Instead with an embodiment, by performing a clock shift 430 (which in this example is 4 slots or 8 clock ticks), data packet 431 is transmitted to avoid polling activity 421, thus allowing the packet to be received without incurring a retry.

As further illustrated in FIG. 4, in a second collision situation scenario 450, also identified as Collision 2, two retries are required due to collision between first packet 451 and first retry packet 452 of the data communication and polling interval 421, leading to a second retry packet 453. Instead with an embodiment, by performing a clock shift 460 (which in this example is 8 slots or 16 clock ticks), data packet 461 is transmitted to avoid polling activity 421, thus allowing the packet to be received without incurring a retry.

Thus as shown in FIG. 4, one or more retries such as caused by a periodic polling interval can be avoided, thereby improving data reliability and reducing power consumption. In Collision 1, 1 retry is saved and 50% current, and in Collision 2, 2 retries are saved, and 66.6% current.

Figure 5:
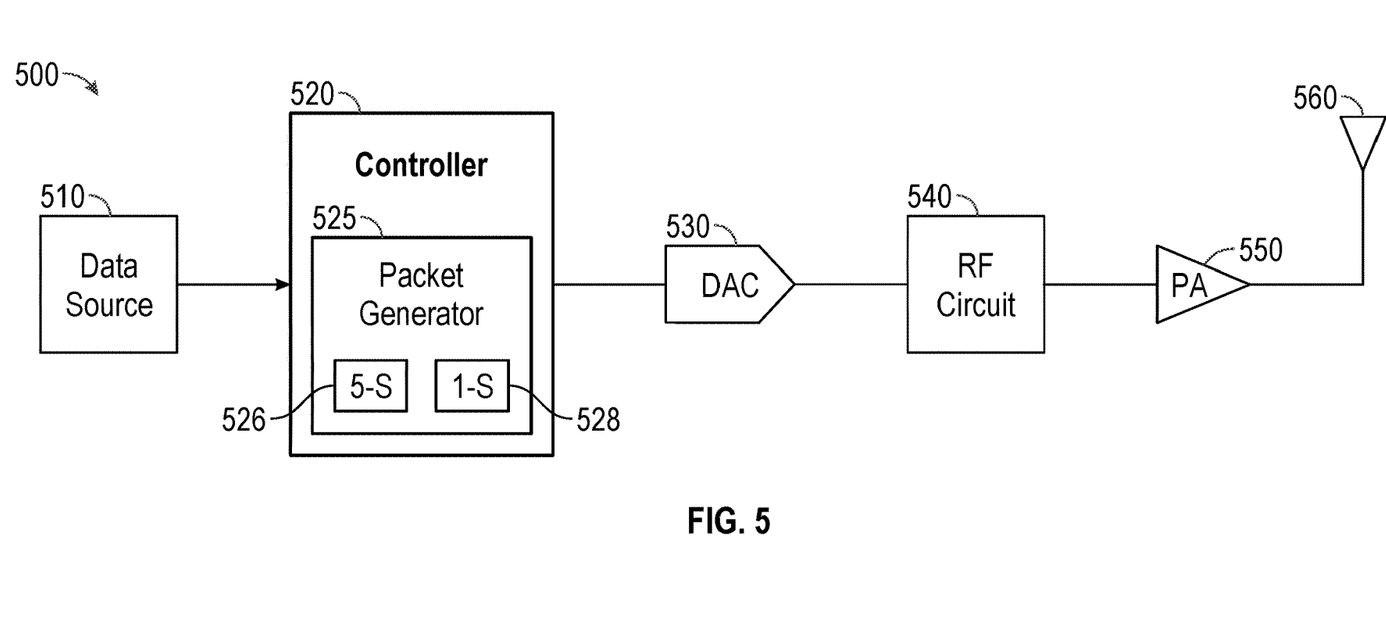
FIG. 5 is a block diagram of an apparatus in accordance with an embodiment.

Referring now to FIG. 5, shown is a block diagram of an apparatus in accordance with an embodiment. As shown in FIG. 5, apparatus 500 may be any type of wireless device that includes a transmitter. In one representative use case, apparatus 500 is a smartphone having transceiver circuitry including a transmitter. As illustrated in FIG. 5, apparatus 500 includes a data source 510, which may be audio source to provide audio streams that are communicated to a controller 520 that includes a Bluetooth controller in accordance with an embodiment.

As shown controller 520 includes a packet generator 525 that generates packets for transmission including the message content provided by data source 510. In an embodiment, packet generator 525 may be configured to generate packets of various slot widths. In an embodiment packet generator 525 may as a base operating mode generate data packets that are of a first slot size (e.g., 5-slot packets 526). Then when it is determined that one or more packets are not properly received, packet generator 525 may move to another operating mode in which it fragments incoming data of the data stream into data packets that are of a second slot size (e.g., 1-slot packets 528).

Controller 520 outputs packets to a digital-to-analog converter (DAC) 530, which converts the incoming digital information into analog form and outputs it to a radio frequency (RF) circuit 540, which processes and upconverts the signals to RF signals. Thereafter a power amplifier 550 amplifies the RF signals and transmits them via an antenna 560.

Figure 6:
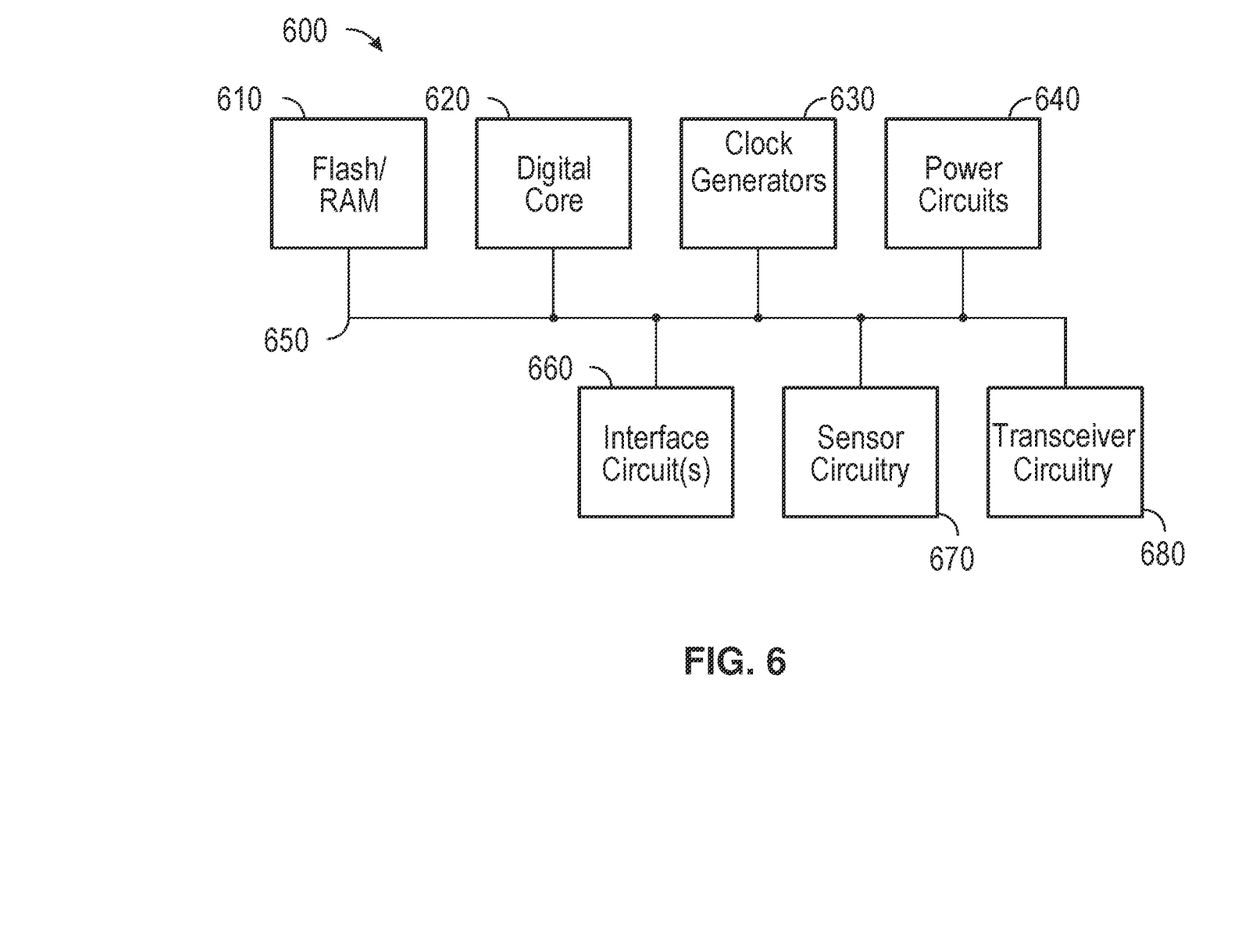
FIG. 6 is a block diagram of a representative integrated circuit that incorporates an embodiment.

Referring now to FIG. 6, shown is a block diagram of a representative integrated circuit 600 that includes control circuitry as described herein. In the embodiment shown in FIG. 6, integrated circuit 600 may be, e.g., a microcontroller or other controller including a wireless transceiver that may operate according to one or more wireless protocols (e.g., WLAN-OFDM, WLAN-DSSS, Bluetooth, among others), or other device that can be used in a variety of use cases, including smartphones, sensing, metering, monitoring, embedded applications, communications, applications and so forth, and which may be particularly adapted for use in an IoT device.

In the embodiment shown, integrated circuit 600 includes a memory system 610 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for identifying, in response to a determination that transmitted packets are not being received, a periodic polling interval occurring between a receiver (of the transmitted packets) and another device, as described herein. Based at least in part on this determination, additional instructions may cause an update to transmission slot timing.

Memory system 610 couples via a bus 650 to a digital core 620, which may include one or more cores and/or microcontrollers that act as a main processing unit of the integrated circuit. In turn, digital core 620 may couple to clock generators 630 which may provide one or more phase locked loops or other clock generator circuitry to generate various clocks for use by circuitry of the IC.

As further illustrated, IC 600 further includes power circuitry 660, which may include one or more voltage regulators. Additional circuitry may optionally be present depending on particular implementation to provide various functionality and interaction with external devices. Such circuitry may include interface circuitry 660 which may provide interface with various off-chip devices, sensor circuitry 670 which may include various on-chip sensors including digital and analog sensors to sense desired signals, such as for a metering application or so forth.

In addition as shown in FIG. 6, transceiver circuitry 680 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

Figure 7:
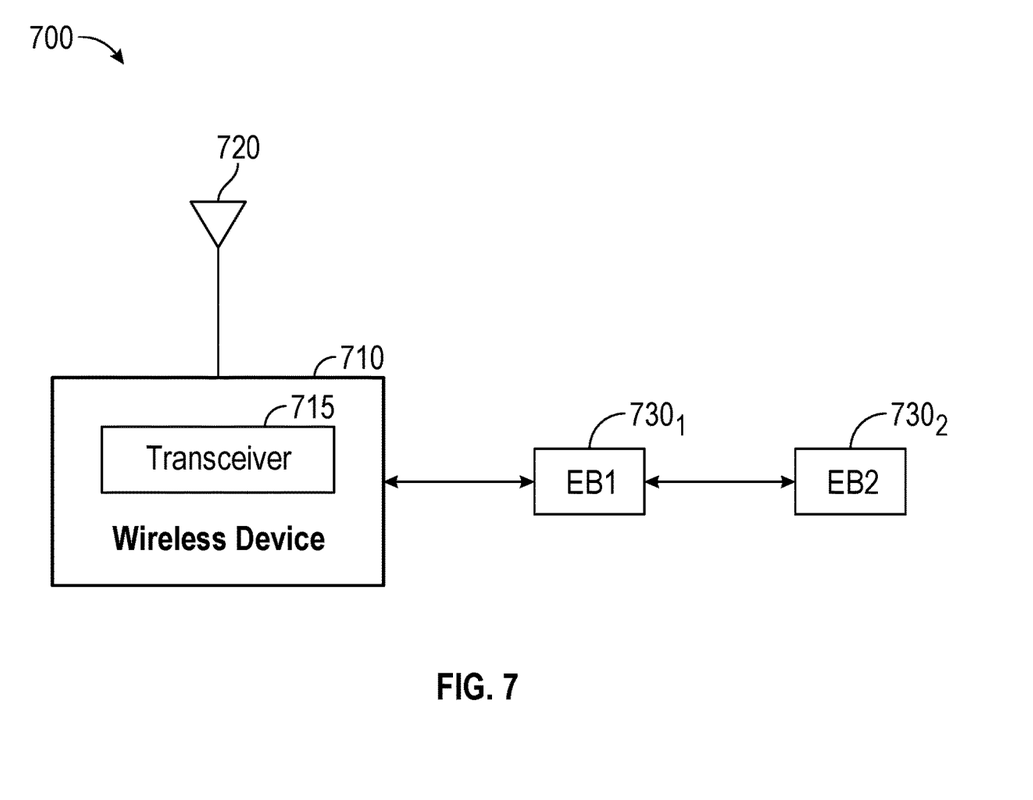
FIG. 7 is an environment in accordance with an embodiment.

Referring now to FIG. 7, shown is an environment in accordance with an embodiment. As shown in FIG. 7, environment 700 may be any type of location in which a wireless device 710 is in wireless (e.g., Bluetooth) communication (via an antenna 720) with at least one other device, here shown as a first earbud 7301. In turn, first earbud 7301, which may be a primary earbud, is in communication with another earbud 7302. Per the discussion herein, wireless device 710 (and more specifically its included transceiver 715) may be configured to adjust its slot schedule when it is determined that its communications with earbud 7301 are not being properly received, e.g., due to a periodic polling interval between earbuds 730.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a controller to receive a data stream from a source, the controller to schedule the data stream for transmission as a plurality of data packets, wherein when a receiver in wireless communication with the apparatus does not respond to a first data packet having a first portion of the data stream, retransmit the first data packet and thereafter fragment a second portion of the data stream into a plurality of fragmented data packets and schedule the plurality of fragmented data packets for transmission;
a digital-to-analog converter (DAC) to convert the plurality of data packets and the plurality fragmented data packets into analog form;
a radio frequency (RF) circuit coupled to the DAC, the RF circuit to process the plurality of data packets and the plurality of fragmented data packets in the analog form and output a plurality of RF signals; and
a power amplifier coupled to the RF circuit to amplify and output the plurality of RF signals.

2. The apparatus of claim 1, wherein the controller is to detect a periodic non-responsiveness of the receiver.

3. The apparatus of claim 2, wherein the controller is to adjust a transmission slot schedule for at least some of the plurality of data packets based on the periodic non-responsiveness.

4. The apparatus of claim 3, wherein the controller is to adjust the transmission slot schedule comprising a shift of a transmit clock slot by a plurality of slots, for at least a portion of the plurality of the data packets.

5. The apparatus of claim 2, wherein the controller is to:
detect the periodic non-responsiveness comprising a periodic polling interval at which the receiver communicates with another device; and
cause the power amplifier to output at least some of the plurality of RF signals when a polling operation of the periodic polling interval is not occurring.

6. The apparatus of claim 2, wherein the controller is to:
identify a first clock slot in response to not receiving a response to a first one of the plurality of fragmented packets;
identify a second clock slot in response to not receiving a response to a second one of the plurality of fragmented packets; and
identify a third clock slot in response to not receiving a response to a third one of the plurality of fragmented packets.

7. The apparatus of claim 6, wherein the controller is to identify a period of the periodic non-responsiveness based at least in part on the first clock slot, the second clock slot, and the third clock slot.

8. The apparatus of claim 1, wherein the controller is to schedule one or more poll packets following the plurality of fragmented data packets.

9. A method comprising:
transmitting, from a transmitter, a first packet to a first device wirelessly coupled to the transmitter;
in response to not receiving a response regarding the first packet from the first device, retransmitting the first packet until a response is received;
transmitting a plurality of second packets to the first device, the second packets having a smaller width than the first packet;
identifying a periodic polling interval at which the first device communicates with another device; and
adjusting a transmit clock slot and transmitting one or more third packets to the first device according to the adjusted transmit clock slot.

10. The method of claim 9, further comprising:
identifying a first clock slot in response to not receiving a response to a first one of the plurality of second packets;
identifying a second clock slot in response to not receiving a response to a second one of the plurality of second packets; and
identifying a third clock slot in response to not receiving a response to a third one of the plurality of second packets.

11. The method of claim 10, further comprising identifying a period of the periodic polling interval based at least in part on the first clock slot, the second clock slot and the third clock slot.

12. The method of claim 11, further comprising identifying the period when a difference between the second clock slot and the first clock slot equals a difference between the third clock slot and the second clock slot.

13. The method of claim 11, wherein adjusting the transmit clock slot comprises shifting the transmit clock slot by a plurality of slots.

14. The method of claim 13, further comprising shifting the transmit clock slot based on an offset determined based at least in part on a current clock slot, the first clock slot and the period of the periodic polling interval.

15. The method of claim 9, wherein adjusting the transmit clock slot enables the first device to receive the one or more third packets without collision with a polling operation between the first device and the another device, the polling operation occurring according to the periodic polling interval.

16. The method of claim 9, further comprising transmitting the first packet comprising a plurality of slots.

17. The method of claim 16, further comprising transmitting the plurality of second packets, each of the plurality of second packets comprising a single slot.

18. A system comprising:
- an audio source to provide audio content;
- a controller coupled to the audio source, the controller to schedule packets of the audio content for transmission according to a slot schedule, wherein the controller is to update the slot schedule in response to detection of a periodic polling interval between a receiver of the transmission and another device coupled to the receiver;
- a baseband circuit to process and output the packets of the audio content according to the slot schedule and thereafter according to the updated slot schedule;
- a radio frequency (RF) circuit coupled to the baseband circuit, the RF circuit to process the packets of the audio content and output a plurality of RF signals; and
- a power amplifier coupled to the RF circuit to amplify and output the plurality of RF signals.

19. The system of claim 18, wherein the controller is to update the slot schedule by shifting a transmit clock slot by a plurality of slots based on an offset determined according to a current clock slot, a first clock slot at which one of the packets of the audio content was not received by the receiver and a period of the periodic polling interval.

20. The system of claim 18, wherein the controller is to detect the periodic polling interval that occurs between the receiver comprising a first earbud and the another device comprising a second earbud.

* * * * *